Figure 1:
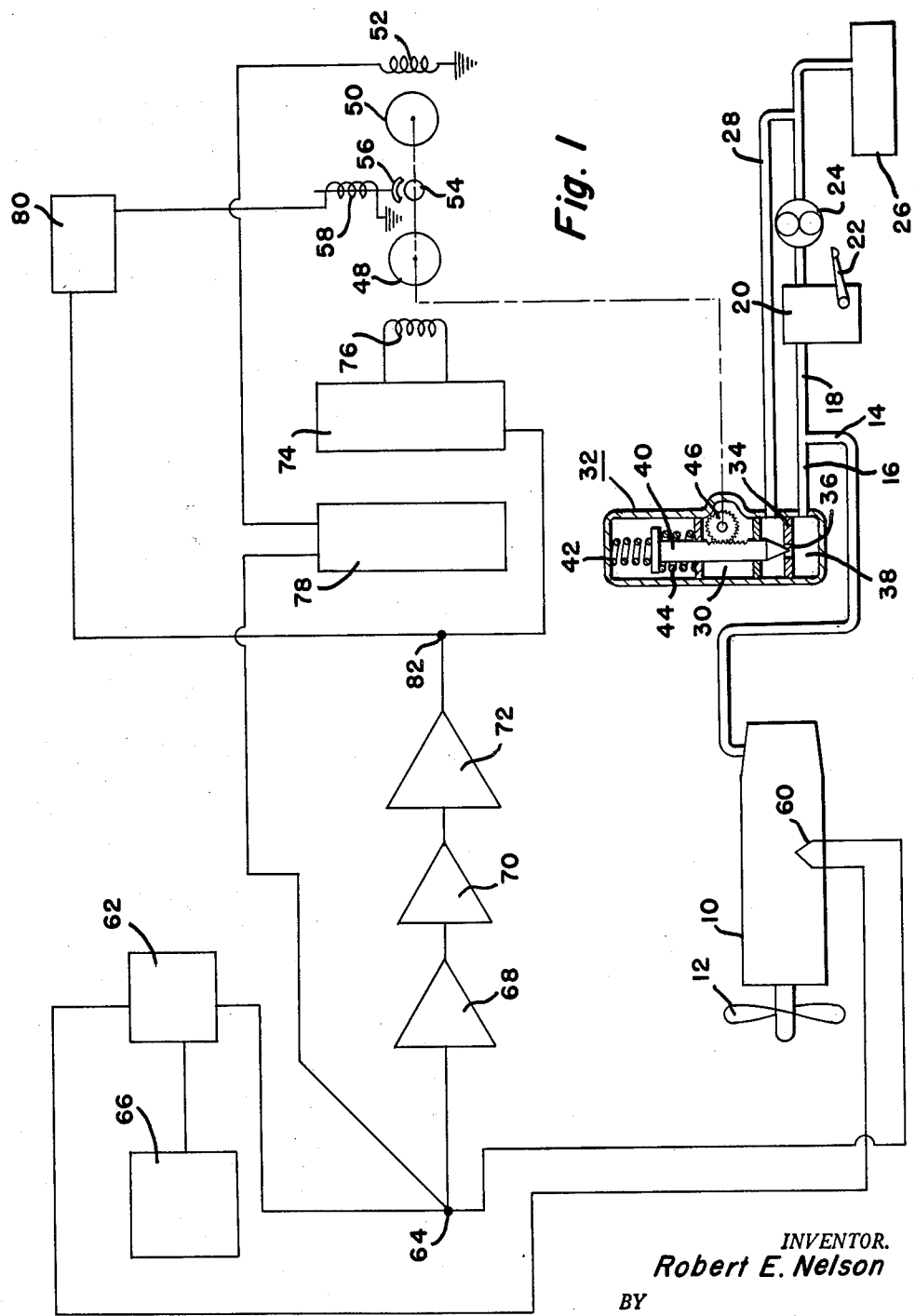

INVENTOR.
Robert E. Nelson
BY
C.R. Meland
His Attorney

INVENTOR.
Robert E. Nelson
BY O. R. Meland
His Attorney

INVENTOR.
Robert E. Nelson
BY C.R. Meland
His Attorney

INVENTOR.
Robert E. Nelson
BY
C. R. Meland
His Attorney

March 17, 1964

R. E. NELSON 3,124,932

TURBINE AIR INLET TEMPERATURE FUEL CONTROL
FOR A GAS TURBINE ENGINE

Filed May 23, 1960

5 Sheets-Sheet 5

INVENTOR.
Robert E. Nelson
BY
C. R. Meland
His Attorney

United States Patent Office 3,124,932
Patented Mar. 17, 1964

3,124,932
TURBINE AIR INLET TEMPERATURE FUEL CONTROL FOR A GAS TURBINE ENGINE
Robert E. Nelson, Indianapolis, Ind., assignor to General Motors Corporation, Detroit, Mich., a corporation of Delaware
Filed May 23, 1960, Ser. No. 30,979
4 Claims. (Cl. 60—39.28)

This invention relates to magnetic amplifiers and more particularly to magnetic amplifiers that are useful in controlling the amount of fuel supplied to a gas turbine or the like in accordance with turbine inlet temperature.

One of the objects of this invention is to provide a fuel control amplifier for controlling fuel supplied to a turbo prop engine or the like in accordance with turbine inlet temperature, that is rugged in operation, and which requires less field servicing time than those heretofore known and which also is accurate in response. This object is carried forward by employing a series of magnetic amplifiers and associated circuits which perform the fuel control function.

Another object of this invention is to provide a magnetic amplifier that is capable of amplifying micro volt inputs and which is self biasing.

A further object of this invention is to provide a magnetic amplifier arrangement that includes a pair of magnetic amplifiers which are connected to have their output currents combined through a resistor to form a bias voltage. It has been found that this circuit arrangement provides little change in output current over large changes in input line voltages.

Still another object of this invention is to provide a power supply that is capable of maintaining a constant direct current output, the supply including a magnetic amplifier having a control winding that is energized from a circuit that includes a Zener diode, the circuit being energized from the output of the magnetic amplifier, and further wherein the magnetic amplifier is self biasing.

A further object of this invention is to provide a fuel control amplifier including an overtemperature relay for releasing a temperature datum brake, and wherein the circuit for operating the relay includes a magnetic amplifier circuit that causes positive closing and opening of the relay contacts.

Another object of this invention is to provide a circuit for operating a relay that includes a magnetic amplifier having a positive feedback winding and a negative feedback winding connected with a voltage responsive circuit element such as a Zener diode. In this circuit small energization of the control winding of the magnetic amplifier causes an avalanche energization of the relay coil because of the presence of the positive feedback winding, this avalanche energization being tempered by the breaking down of the Zener diode which causes the energization of the negative feedback winding.

Further objects and advantages of the present invention will be apparent from the following description, reference being had to the accompanying drawings wherein preferred embodiments of the present invention are clearly shown.

In the drawings:

FIGURE 1 is a block diagram of a fuel control amplifier for controlling the fuel supplied to a turbo prop engine.

FIGURES 2A, 2B, 2C and 2D taken together are a schematic electrical circuit diagram of a fuel control amplifier made in accordance with this invention.

Referring now to the drawings and more particularly to FIGURE 1, the reference numeral 10 designates a turbo prop engine which drives the propeller 12. The turbo prop engine 10 is fed with fuel via a pipe 14 which is connected with a by-pass pipe 16 and a fuel inlet pipe 18. The fuel inlet pipe 18 is connected with a main control 20 which is varied by a lever 22 operated by the pilot of the aircraft. It can be seen that the main control 20 is connected with a pump 24 having an inlet connected with a source of fuel 26. The inlet is also connected with a by-pass pipe 28 and it is seen that this by-pass pipe 28 is connected with the chamber 30 of a fluid-by-pass control valve generally designated by reference numeral 32. The by-pass valve 32 has a wall 34 formed with an opening 36 that connects the chambers 30 and 38. A shiftable valve member 40 controls the flow capacity of the opening 36 which controls the connection of chambers 30 and 38. The valve 40 is normally biased to a slightly open position by springs 42 and 44 which hold the valve in a null position. The valve 40 is shifted by a gear 46 having a mechanical connection with a motor designated by reference numeral 48.

The motor 48 is a two-phase motor and drives a generator 50 having an output winding 52. The motor 48 and generator 50 are mechanically connected and are connected with a brake disk 54 which may be contacted by a brake member 56 under the control of a relay coil 58. When the relay coil 58 is energized the brake is released and under other conditions the braking member 56 engages the brake disk 54 to hold the valve 40 in a predetermined position.

It can be seen that the fluid circuit that includes pipe 16, chamber 38, orifice 36, chamber 30 and pipe 28 constitute a by-pass for fuel. Thus, the position of valve 40 will control the amount of fuel that is by-passed away from the engine and as will become more readily apparent hereinafter the positioning of this valve is controlled in accordance with turbine air inlet temperature.

The circuit for controlling the positioning of valve 40 in accordance with turbine air inlet temperature includes a thermocouple 60 which is connected with a voltage dividing network 62 and with the junction 64. The voltage dividing network 62 is connected with a constant voltage source 66 and is also connected with the junction 64. The junction 64 feeds a micro volt magnetic amplifier 68 and it is seen that this amplifier feeds a low level magnetic amplifier 70. The low level magnetic amplifier 70 feeds a magnetic amplifier 72 and the output of this magnetic amplifier is fed to a saturable reactor motor drive circuit 74 that is connected with the input winding 76 of the two-phase motor 48.

A rate feedback circuit is provided which includes a phase responsive circuit 78 that is connected with the output winding 52 of generator 50 and which has an output connected with the junction 64. The circuit illustrated in FIGURE 1 also includes a null circuit 80 which is connected to control the temperature datum brake relay coil 58 and which is connected with the junction 82.

In the operation of the system illustrated in FIGURE 1, the thermocouple develops a voltage in accordance with turbine inlet temperature and this voltage is compared with a voltage developed by the potentiometer network 62 that is preset to give the desired fuel by-pass for a given turbine inlet temperature. When the turbine inlet temperature deviates from a desired value, as set up by the potentiometer network 62, an error voltage is fed to the input of the magnetic amplifier 68 and through the amplifiers 70 and 72 to the saturable reactor motor drive 74. This causes the motor 48 to operate which, in turn, drives the valve 40 in the proper direction to by-pass more or less fuel. When the motor 48 operates, it rotates the rotor of generator 50 to produce an output voltage in winding 52 that is fed to the phase sensitive circui. 78. The circuit 78 has an output which is fed back to the junction 64 so that a voltage is fed to the amplifier 68 which is an indication of the rate of change of movement of the valve 40.

Under normal conditions when the fuel control amplifier is operating the relay coil 58 is energized so that the brake 56 does not impede movement of the motor shaft 48 to vary the setting of valve 40 in accordance with turbine inlet temperature. Under certain conditions of operation, however, such as when landing the aircraft, it is desirable to fix the setting of the valve 40 for a predetermined by-pass of fuel. In such a case suitable circuitry causes the coil 58 to be energized to apply the brake and fix the valve 40 at its setting at that time. The null circuit 80 shown schematically in FIGURE 1, operates to energize the coil 58 to cause the brake to be released upon a predetermined overtemperature condition which is indicated by a voltage appearing at junction 82 and applied to the null circuit 80. This null circuit is more fully described hereinafter.

In FIGURE 1, the fuel control system for the turboprop engine has been over simplified in order to provide a clear and understandable disclosure of this system. Thus, the system may be more elaborate than that shown in FIGURE 1 and may include elements in addition to the valve 32 which are shown in co-pending application S.N. 464,094 filed on March 23, 1955, now Patent 2,938,340. This system is also illustrated in British Patent 808,920. It can be seen from an inspection of this patent application and the British patent that the fuel control system may include other elements, for example, a diaphragm operated by-pass valve which is connected with a Venturi.

FIGURES 2A through 2D which are now to be described, are a schematic representation of the fuel control amplifying circuit of this invention it being understood that the various figures only form portions of the total circuit and that these figures are connected together by lead wires in a manner to be more fully described hereinafter.

Figure 2A:
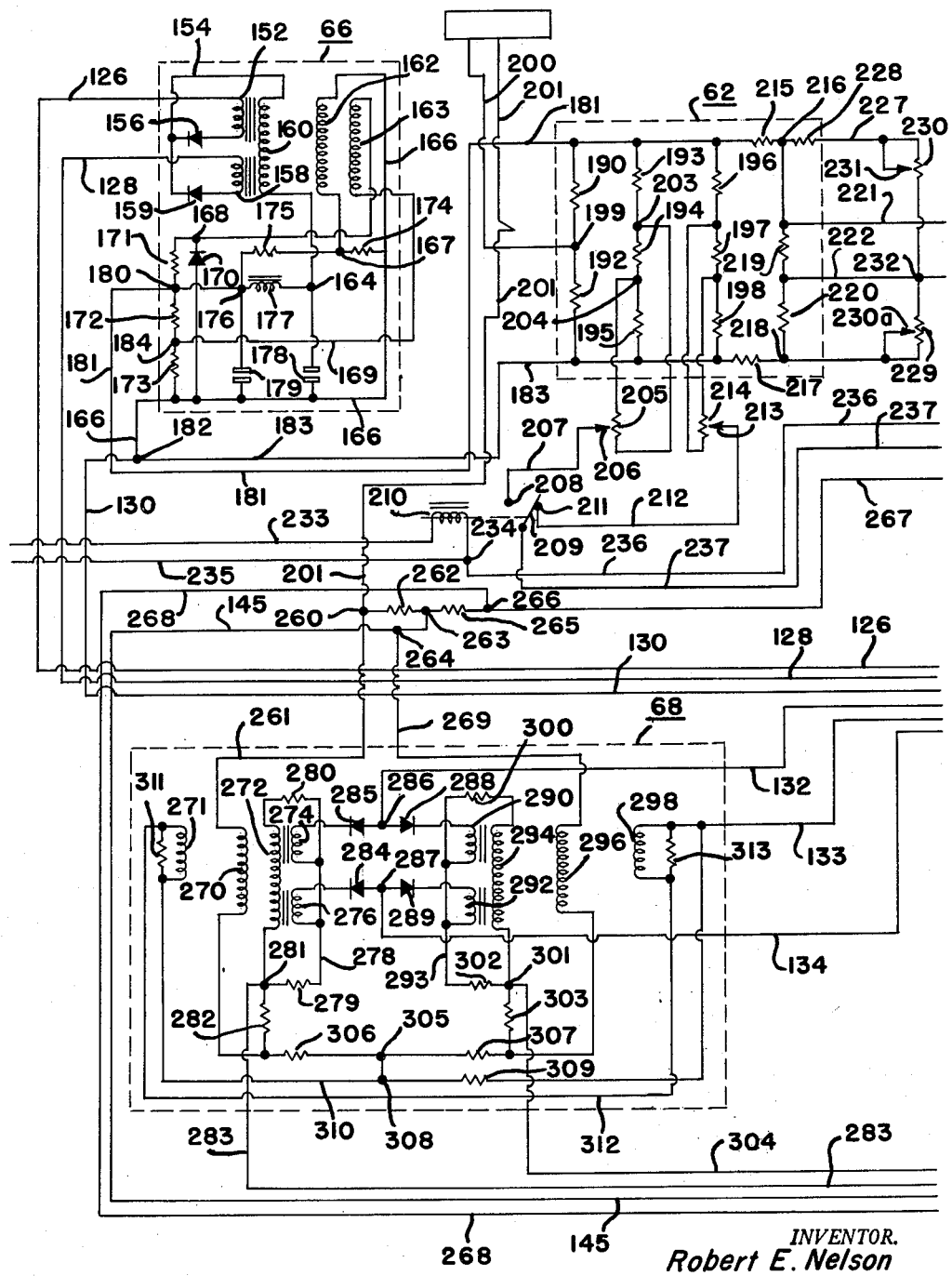
Figure 2B:
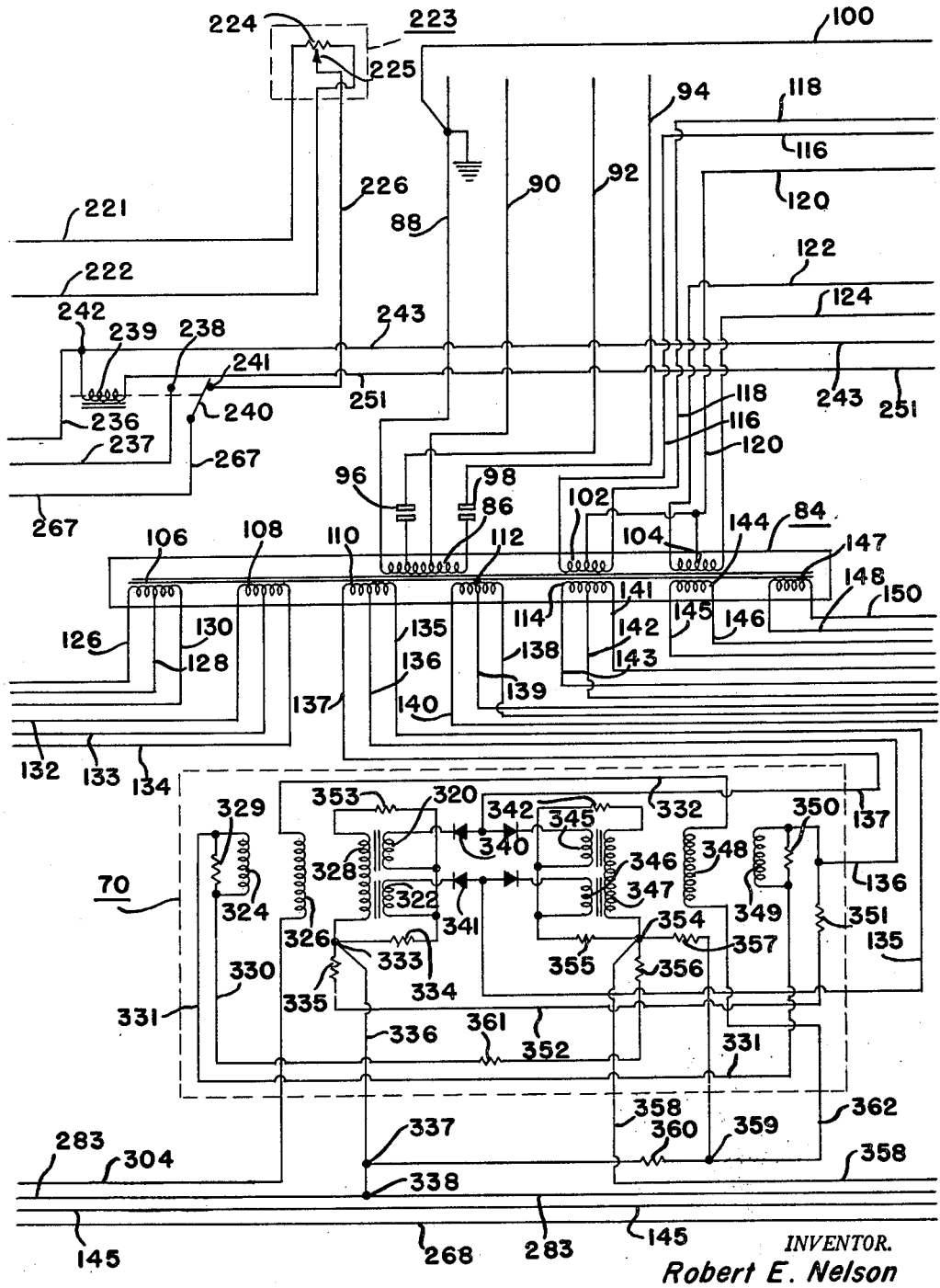

Referring now to FIGURE 2B, the reference numeral 84 generally designates a transformer having a primary winding 86 connected with the lead wires 88, 90, 92 and 94. A condenser 96 is connected with the lead wire 92 and in a like manner a condenser 98 is connected with the lead wire 94. The lead wires 88 and 90 form input leads for the transformer and are preferably energized with 115 volt 400 cycle A.C. voltage. It is seen that the lead wire 88 is connected with a lead wire 100 which is connected with the other portions of the circuit as will be apparent from the other figures of the drawing. The transformer, in addition to the primary winding 86 has center tapped secondary windings 102, 104, 106, 108, 110, 112, and 114. The secondary winding 102 is connected with lead wires 116 and 118. The center tap of secondary winding 102 is connected with the center tap of secondary winding 104 and these center taps are connected to a common lead wire 120. The secondary winding 104 has its outer ends connected with lead wires 122 and 124. In a similar fashion secondary winding 106 is connected with lead wires 126, 128 and 130 whereas secondary winding 108 is connected with lead wires 132, 133 and 134. In a like manner, secondary winding 110 is connected with lead wires 135, 136 and 137. Secondary winding 112 is connected with lead wires 138, 139 and 140. The secondary winding 114 is connected with lead wires 141, 142 and 143.

The secondary winding 144 has no center tap and it is connected with lead wires 145 and 146. The secondary winding 147 likewise has no center tap and is connected with lead wires 148 and 150. The same reference numerals have been used to indicate these lead wires in each of the FIGURES 2A through 2D so that the entire circuit may be readily traced.

As examples of voltages that are obtained from the secondary windings the secondary winding 102 may have 36 volts A.C. from center tap to outer conductor, whereas the secondary winding 104 may have 8.9 volts between center tap and outer conductors. The secondar 106 may have 21.5 volts between center tap and outer conductors whereas the secondary winding 108 has 5.4 volts between center tap and outer conductor. The secondary winding 110 has 9 volts between center tap and outer conductors and the secondary winding 112 has 27.5 volts between center tap and outer conductors. The secondary winding 114 has 24.6 volts between center tap and outer conductors and the secondary winding 144 has 10 volts across its conductors. The secondary winding 147 has 120 volts between its outer conductors.

Referring now to FIGURE 2A, it is seen that the constant voltage source is enclosed in dotted lines and is designated by reference numeral 66 as it was in FIGURE 1. A.C. input power is fed to this reference voltage source via the lead wires 126, 128 and 130, which are connected with the secondary winding 106 of transformer 84. The lead wire 126 is connected to one side of a load winding 152 of a magnetic amplifier. The opposite side of load winding 152 is connected with lead wire 154 through a rectifier 156. The magnetic amplifier has another load winding 158 connected between the lead wire 128 and a rectifier 159. The magnetic amplifier includes a negative feedback winding 160, a bias winding 162, and a control winding 163. The negative feedback winding 160 is connected between lead wire 154 and a junction 164 whereas the bias winding 162 is connected between a lead wire 166 and the junction 167. It is seen that the control winding 163 is connected between junction 168 and the lead wire 169. A voltage responsive diode of the Zener type 170 is connected between the junction 168 and the lead wire 166. The series connected resistors 171, 172 and 173 are connected between the lead wire 166 and the junction 168. A resistor 174 is connected between lead wire 166 and the junction 167. A resistor 175 is connected between the junction 167 and the junction 176. An inductor 177 connects the junctions 164 and 176 and it is seen that condensers 178 and 179 are connected with opposite sides of the inductor and with the lead wire 166. The junction 176 is connected with a junction 180 and it is seen that both of these junctions are connected with a lead wire 181. The lead wire 166 is connected with lead wire 130 at junction 182 and is also connected with lead wire 183 at this junction.

The circuit designated by reference numeral 66 and which has just been described operates to provide a constant 10 volts across the lead wires 181 and 183 even though the A.C. voltage input from leads 126, 128 and 130 may vary. When A.C. power is supplied to the circuit 66 there is no bias current and the output voltage rapidly builds up until the output is approximately 10 volts between junction 180 and lead wire 166. The resistors 172 and 173 are so chosen that their sum is equal to approximately 1000 ohms and the voltage across resistor 173 is the same as the voltage across the Zener diode 170 when separate 10 milliamps flows through the diode. If the voltage output should tend to be greater than 10 volts a voltage greater than the Zener voltage would appear across the resistor 173 and control current will flow through the control winding 163 in such a direction as to make the output return to 10 volts. In other words, when the output voltage changes across junction 180 and lead wire 166 the difference in potential of junctions 168 and 184 also changes to cause a change in the control current flowing through control winding 163 and, thus, change the saturation of the magnetic amplifier to reduce or increase the voltage applied to the junction 180 and lead wire 166.

It will be appreciated that the inductor 177 and the condensers 178 and 179 form a filter circuit for the power supply 66. It is also to be pointed out that the voltage reference circuit 66 is self biased by utilizing the voltage output fed back in a negative direction through the bias setting resistor 175. The effect of this type of biasing is twofold; first performing the biasing action and secondly acting as a minor loop in voltage regulation. This is accomplished since, should the voltage tend to decrease, the bias current would also decrease changing the bias point in the direction to increase the output of the magnetic amplifier.

It can be seen from FIGURE 2A that the voltage output from the voltage reference source 66 appears across lines 181 and 183 and it is seen that these lines are connected with the voltage dividing or potentiometer network 62. As is clearly apparent from FIGURE 2A this resistor network 62 includes the resistors 190 and 192 which are connected directly across the output of the voltage reference circuit 66. Also connected directly across this output is a network including the resistors 193, 194 and 195. Another network including resistors 196, 197 and 198, is connected across the voltage output of the reference circuit 66. The junction 199 is connected to a lead wire 200. This lead wire 200 and the lead wire 201 are connected with the thermocouple 60 and thus form the thermocouple input for the fuel control amplifier.

The junctions 203 and 204 are connected together by a potentiometer 205 having a slider 206 connected with the lead wire 207. The lead wire 207 is connected to a fixed contact 208 of a relay having a shiftable contactor 209 operated by the relay coil 210 and having another fixed contactor 211. When the relay coil 210 is de-energized the shiftable contactor 209 engages the fixed contact 211. When the coil 210 is energized the contact 209 is shifted over into engagement with the fixed contact 208. The fixed contact 211 is connected with a lead wire 212 which is, in turn, connected to the slider 213 on a potentiometer 214. It can be seen that the potentiometer 214 is connected across the resistor 197.

The lead wire 181 is connected with a resistor 215 and is seen that this resistor is connected with junction 216. The lead wire 183 is connected with resistor 217 and this resistor is connected with junction 218. Connected across the junctions 216 and 218 are the resistors 219 and 220. The lead wires 221 and 222 are connected across the resistor 219. These lead wire 221 and 222 are connected with a coordinator generally designated by reference numeral 223 which is illustrated in FIGURE 2B. This coordinator includes a potentiometer 224 having a slider 225 connected with a lead wire 226. The slider 225 may be operated by the pilot control lever.

The junction 216 is connected with lead wire 227 through a resistor 228. The junction 218 is connected with potentiometer 229 having a slidable tap 230a. The lead wire 227 is connected with potentiometer 230 having a slider 231. It is seen from FIGURE 2A that the lead wire 222 is connected with the junction 232.

The relay coil 210 has one side thereof connected with lead wire 233 and has an opposite side thereof connected with junction 234. The junction 234 is connected with lead wires 235 and 236. The lead wire 233 is connected with a relay box of the system which is not illustrated and the lead wire 235 is connected with one side of a 24-volt direct current power source.

The shiftable contactor 209 is connected with a lead wire 237 which is connected with the fixed contact 238 of another relay illustrated in FIGURE 2B. It is seen that this relay includes a coil winding 239 that operates the shiftable contactor 240. This relay further includes a fixed contact 241 connected with lead wire 226 and when the coil 239 is de-energized the contactor 240 will engage the contact 241. When the relay coil 239 is energized the contactor 240 is shifted into engagement with the fixed contact 238. It is seen that one side of the relay coil 239 is connected with the lead wire 236 which is one side of the 24 volt direct current power source. The lead wire 236 is connected with junction 242 and this junction is connected with a lead wire 243. The lead wire 243 extends into the circuit illustrated in FIGURE 2C and is connected with a terminal block having a junction point 244. This junction point is connected with the temperature datum valve brake 58. The lead 243 is also connected with a junction 245 that is in turn connected to a relay coil 246. The opposite side of relay coil 246 is connected with lead wire 247 and the junction 248. The junction 248 is connected with a point 249 on the terminal board that is connected with a relay box not shown. It is seen that the opposite side of the relay coil 246 is also connected with junction 250 that is connected with the lead wire 251. The relay coil 246 operates the shiftable contactors 252 and 253 which are respectively in engagement with fixed contacts 254 and 255 when the relay coil is de-energized. When the relay coil 246 is energized the shiftable contactors are shifted into engagement respectively with fixed contacts 256 and 257. It is seen that the lead wire 251 is also connected to one side of the relay coil 239 illustrated in FIGURE 2B.

The relay coil 210 is a speed sensitive slave relay whereas the relay coil 239 is a limit select relay coil 239 is a limit select relay. The relay 246 and its associated circuits are also a limit select relay.

Referring now once more to FIGURE 2A, it is seen that the lead wire 201 which is connected to one side of the thermocouple, is connected with a junction 260. This junction 260 is connected with lead wire 261 and is also connected with the resistor 262. The opposite side of resistor 262 is connected with junction 263 which, in turn, is connected with junction 264 and the lead wire 145. The junction 263 is also connected with resistor 265, the opposite side of this resistor being connected with junction 266. The junction 266 is connected with lead wires 267 and 268. The lead wire 267 is connected with the shiftable relay contactor 240 as is clearly apparent from FIGURE 2B. The junction 264 is connected with a lead wire 269.

The voltage outputs of the thermocouple 60 and the potentiometer network 62 are algebraically added and the resultant error voltage is applied to the magnetic amplifier circuits 68 via the lead wires 261 and 269. The lead wire 261 is connected with the control winding 270 of one of the two magnetic amplifiers that make up the total magnetic amplifier circuit 68. The left hand magnetic amplifier includes this control winding 270, a bias winding 271, a feedback winding 272 and a pair of load or gate windings 274 and 276. The load windings 274 and 276 are both connected with a common lead 278 that is connected between resistors 279 and 280. It is seen that the resistor 280 is connected with one side of the feedback winding 272. This feedback winding has its opposite side connected with junction 281 and this junction is connected with resistor 282 and a lead wire 283. The load windings 274 and 276 are connected with rectifiers 284 and 285, the rectifier 285 being connected with a junction 286 and the rectifier 284 being connected with junction 287. The junction 286 is connected with rectifier 288 whereas the junction 287 is connected with rectifier 289. The junction 286 is also connected with a lead wire 132 and the junction 287 is connected with a lead wire 134. The lead wires 132, 133 and 134 form the input power terminals to the magnetic amplifier circuit 68 and are connected with the secondary winding 108 of transformer 84.

The right hand magnetic amplifier illustrated in FIGURE 2A includes the load windings 290 and 292 having one of their sides connected with lead wire 293 and having their opposite sides connected respectively with rectifiers 288 and 289. This right magnetic amplifier also includes a feedback winding 294, a control winding 296 and a bias winding 298. One side of the control winding 294 is connected with resistor 300, the opposite side of this winding being connected with junction 301. The junction 301 is connected with resistors 302 and 303 and is also connected with the lead wire 304. The resistors 282 and 303 are connected with a junction 305 via the resistors 306 and 307. The junction 305 is connected with junction 308 and this junction is connected to a resistor 309 and to a lead wire 310. The lead wire 310 is connected to one side of bias winding 271 and thus, to one side of resistor 311. The opposite side of resistor 311 is connected with a lead wire 312 and this lead wire is connected to one side of the bias winding 298 and the resistor 313.

As noted hereinbefore the A.C. power to the magnetic amplifier circuit 68 is supplied thereto via the lead wires 132, 133 and 134, and direct current power is taken off the magnetic amplifier circuit via lead wires 304 and 283 which are connected with the junctions 281 and 301. It will be appreciated that in this circuit the saturation of the two magnetic amplifiers is controlled by the feedback, bias and control windings so that the two amplifiers have their firing point varied in accordance with the current flow to the various windings. The rectifiers 285, 288, 284 and 289 provide direct current output from the magnetic amplifier circuit 68.

The magnetic amplifier circuit 68 is self biasing and, thus, requires no external biasing supply. The circuit is designed such that with a given firing angle in both of the magnetic amplifiers, the current through resistors 282 and 306 is equal to the current through resistors 303 and 307 and is equal to approximately 2½ milliamps. It can be seen that these currents combine through the resistor 309 to form a bias voltage. This voltage causes a biasing current to flow through the bias windings 271 and 298 and is trimmed by resistors 311 and 313 to allow for the tolerances in winding resistances and core variations. The action of this biasing circuit under conditions of varying line voltage is very important.

As line voltage is varied upward the voltage out of the magnetic amplifiers tends also to increase upward thereby increasing the voltage across resistor 309. This, in turn, furnishes more biasing current which changes the firing angle to a new voltage output. The net effect of this is very small changes in the output current over large changes in the line voltages. Other advantages of this system of biasing are that the total sum of the current flowing through resistors 279 and 306 and through resistors 303 and 307 are maintained as a constant over the operating range of the two magnetic amplifiers. Thus, if the current through resistors 279 and 306 increases by one milliamp, for example, the current flow through resistors 303 and 307 must decrease by one milliamp and the two magnetic amplifiers can be prevented from flip-flop operation and both are held in their operating ranges.

The amplifier 68 may be thought of as a voltage amplifier rather than as a current amplifier with a gain fixed by the bridge resistors 279, 306 and 303 and 307. It will, of course, be appreciated that the voltage input to the magnetic amplifier 68 is in the micro volt range and that this voltage input will control the firing angles of the magnetic amplifiers to provide a direct current output across lead wires 283 and 304 which is applied to the low level amplifier generally designated by reference numeral 70 and shown in detail in FIGURE 2B.

Referring now more particularly to FIGURE 2B, it is seen that the lead wires 283 and 304 coming from the magnetic amplifier circuit 68 are fed to the magnetic amplifier circuit 70. The magnetic amplifier circuit 70 includes a first magnetic amplifier having load windings 320 and 322. This amplifier also includes a bias winding 324, a control winding 326 and a feedback winding 328. The bias winding 324 is shunted by a resistor 329 and the bias winding and resistor are connected between lead wires 330 and 331. The control winding 326 has its one side connected with lead wire 304 and has its opposite side connected with lead wire 332. The feedback winding 328 is connected with junction 333 and it is seen that this junction is connected with resistors 334 and 335 and with a conductor 336 connected with junction 337. The junction 337 is connected with a junction 338 which is, in turn, connected with the lead wire 283. The load windings 320 and 322 are connected with rectifiers 340 and 341, one side of these rectifiers being connected with lead wires 137 and 135.

The other magnetic amplifier includes load windings 345, and 346, a feedback winding 347, a control winding 348 and a bias winding 349 shunted by the resistor 350. One side of the bias winding 349 and the resistor 350 are connected with lead wire 136 and resistor 351. The resistors 351 and 335 are connected by a lead wire 352. The load winding 345 and one side of the feedback winding 347 are connected by a resistor 342 and in a like manner, one side of the load winding 320 and the feedback winding 328 are connected by a resistor 353. One side of the feedback winding 347 is connected with a junction 354 and this junction is connected with resistors 355, 356, 357 and the lead wire 358. The junction 337 is connected with junction 359 via a resistor 360 and it is seen that the junction 359 is connected to one side of resistor 357. A resistor 361 is connected between resistor 356 and the lead wire 330. The junction 359 is connected to one side of the control winding 348 via a lead wire 362.

A.C. input power is supplied to the magnetic amplifier circuit 70 from the transformer secondary 110 via the lead wires 135, 136, and 137. The signal input to the magnetic amplifier 70 comes through the lead wires 283 and 304 from the magnetic amplifier circuit 68. This low level amplifier 70 is generally similar to the microvolt amplifier 68 except that a higher operating voltage is placed on the load winding and the output range is six times higher. The manner of obtaining feedback is also somewhat different.

Figure 2C:
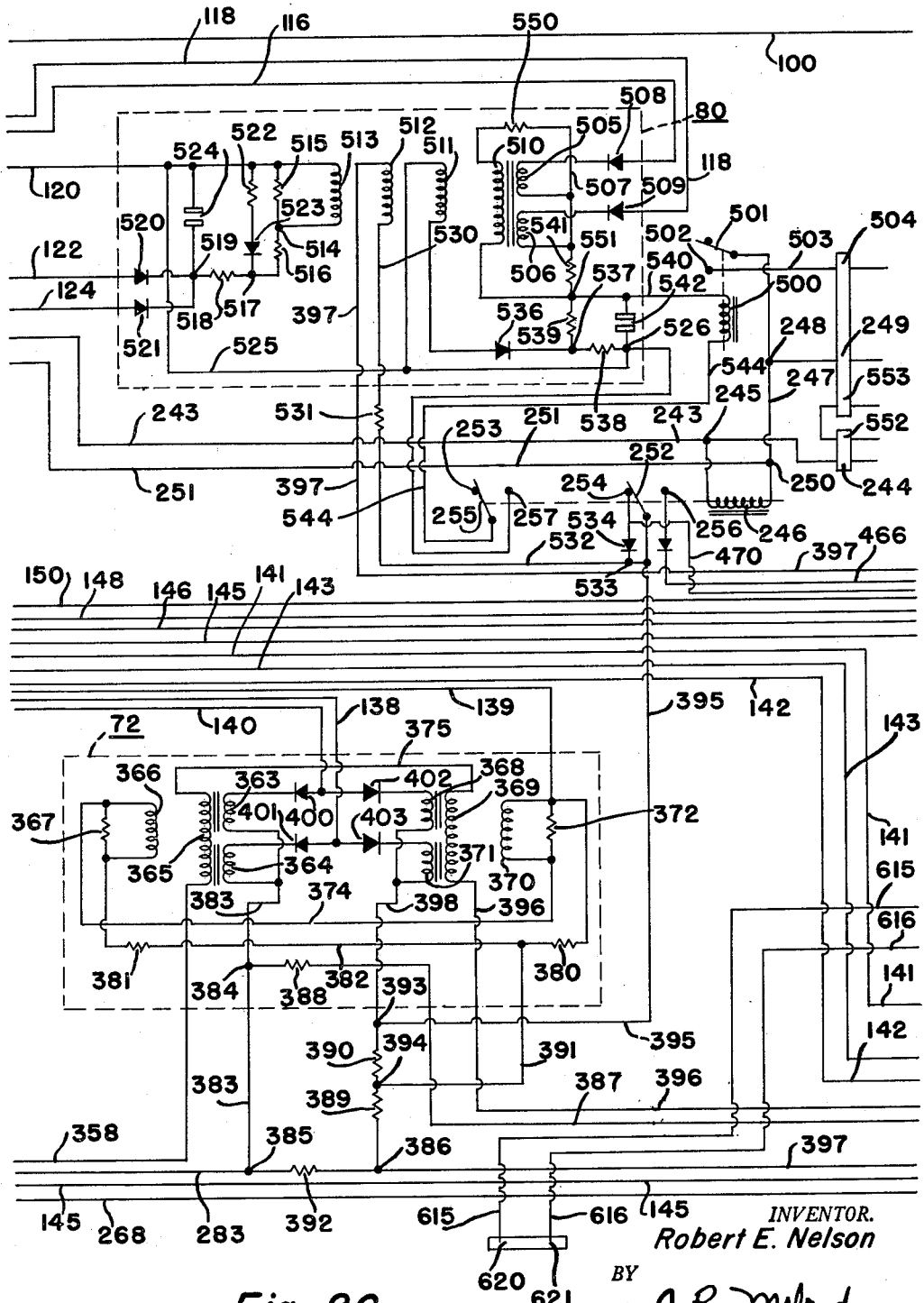

The output power from the magnetic amplifier circuit 70 is taken from junctions 333 and 354 and is passed on to the magnetic amplifier circuit 72 via the lead wires 358 and 283. The magnetic amplifier 72 shown in FIGURE 2C is similar to the magnetic amplifiers 68 and 70 and includes a pair of amplifiers, one of which has the load windings 363 and 364, a control winding 365 and a bias winding 366 shunted by a resistor 367. The other amplifier includes the load windings 368 and 371, a control winding 369 and a bias winding 370 shunted by the resistor 372.

The bias windings shunted by their resistors are connected by a lead wires 374 and the control windings are connected by a lead wire 375. The bias windings 366 and 370 are connected by a circuit that includes the resistors 380 and 381 plus the conductor 382. The load windings 363 and 364 are connected with a lead wire 383 which is connected with junctions 384 and 385. The junction 383 is connected with junction 386 via a resistor 392 and the junction 384 is connected with a resistor 388. The opposite side of resistor 388 is connected with a lead wire 387 whereas the junction 386 is connected with resistors 392, 389 and 390. A lead wire 391 connects lead wire 382 with the junction 394. The junction 393 is connected to one side of the load windings 368 and 371 via the lead wire 398 and is also connected with a lead wire 395. One side of the control winding 369 is connected with a lead wire 396. The junction 386 is connected with a lead wire 397 as is clearly apparent from FIGURE 2C.

The load windings 363 and 364 are connected with rectifiers 400 and 401 whereas the load windings 368 and 371 are connected with rectifiers 402 and 403. The rectifiers 400 and 402 are fed from the line 140 whereas the rectifiers 401 and 403 are fed from the line 138. The A.C. power input for the magnetic amplifier circuit 72 comes from the secondary winding 112 via the lead wires 138, 139 and 140. As noted hereinbefore the direct current signal from magnetic amplifier circuit 70 is applied to the magnetic amplifier circuit 72 via the lead wires 358 and 283. The magnetic amplifier circuit 72 operates to amplify this direct current voltage by varying the saturation of the two magnetic amplifiers of this circuit in accordance with the signal voltage which it receives from the magnetic amplifier circuit 70. The output voltage of magnetic amplifier circuit 72 is developed across the junctions 386 and 393 and is, thus, applied to the lead wires 395 and 397.

Figure 2D:
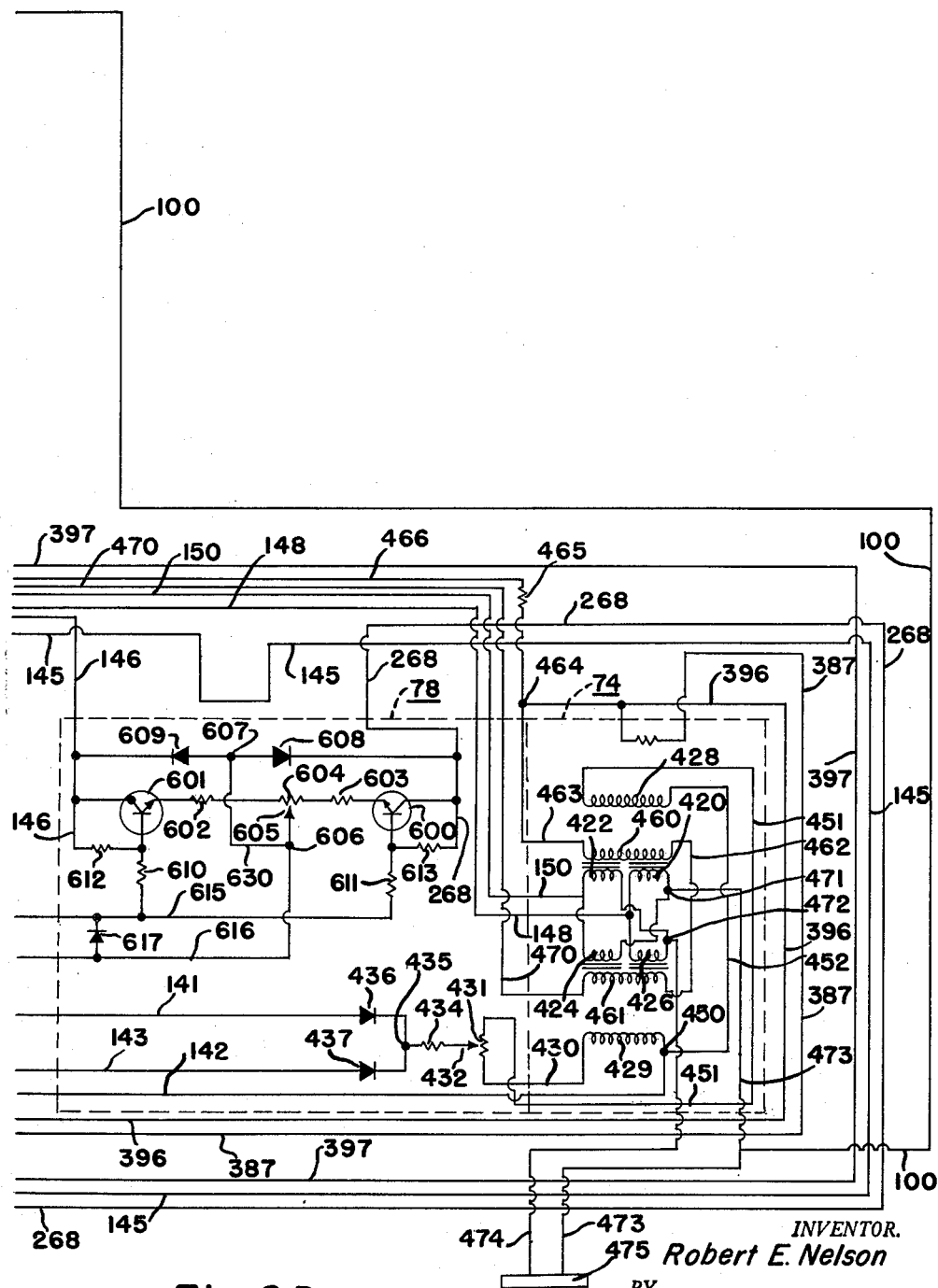

The output voltage appearing across leads 395 and 397 is used to drive a saturable reactor stage which is generally designated by reference numeral 74 and which is enclosed in dotted lines in FIGURE 2D. This saturable reactor motor drive circuit includes the load windings 420, 422, 424 and 426, which are connected together as shown. The lead wires 148 and 150 which are energized from secondary winding 147 of the transformer 84 are connected with the load windings in a manner which is clearly apparent from FIGURE 2D. The saturable reactor motor drive also includes the bias windings 428 and 429. One side of the bias winding 429 is connected with a lead wire 430 which, in turn, is connected to one side of a potentiometer 431 having a slider 432. The slider 432 is connected with a resistor 434, the opposite side of this resistor being connected with a junction 435. The junction 435 is connected with rectifiers 436 and 437 which are connected with lead wires 141 and 143. The lead wires 141 and 143 are connected with the secondary winding 114 of transformer 84.

The bias winding 429 is connected with a junction 450 and it is seen that this junction is connected with lead wire 451 which connects with one side of the potentiometer resistor 434 through lead wire 452 and control winding 428. The junction 450 is connected with the lead wire 142 which is the center tap of the secondary winding 114.

The saturable reactor motor drive includes the control windings 460 and 461 which have one of their sides connected together by the lead wire 462. The opposite side of control winding 460 is connected with a lead wire 463 which is, in turn connected with junction 464 and the lead wire 396. The junction 464 is connected to one side of a resistor 465, the opposite side of this resistor being connected with lead wire 466. One side of the control winding 461 is connected with a lead wire 470 as is clearly apparent from an inspection of FIGURE 2D.

The output of the saturable reactor circuit 74 is taken off at junctions 471 and 472 which are connected respectively with lead wires 473 and 474. It is seen that the lead wire 473 is connected with the line 100 and that the lead wires 474 and 473 are brought out to a junction block 475. The lead wire 474 is connected with the two-phase motor 48 whereas the lead wire 473 forms a 115 volt common lead.

Referring now more particularly to FIGURE 2C the null circuit 80 which is enclosed in dotted lines, will now be described. The null circuit 80 is designed to control the energization of a relay that includes the relay coil 500, the shiftable contactor 501 and the fixed contact 502. When the relay coil 500 is de-energized the contactor 501 remains out of contact with the fixed contact 502 but when the relay coil 500 is energized the shiftable contactor 501 is shifted into engagement with the fixed contact 502. The fixed contact 502 is connected with a lead wire 503 that leads to a point 504 on a junction block. The point 504 of the junction block is operative to control the brake relay 58 illustrated in FIGURE 1. The circuit designated by reference numeral 80 operated to cause positive operation of the relay which includes the coil 500 in a manner to be more fully described.

It can be seen that the null or relay operating circuit 80 includes a magnetic amplifier having load windings or gate windings 505 and 506 both of which are connected to a common lead wire 507. The load winding 505 is connected with a rectifier 508 whereas the load winding 506 is connected with the rectifier 509. The opposite side of rectifier 508 is connected with lead wire 116. The opposite side of rectifier 509 is connected with lead wire 118 which is connected to the transformer winding 102.

The magnetic amplifier of relay operating circuit 80 in addition to the load winding includes a positive feedback winding 510, a negative feedback winding 511, a control winding 512 and a bias winding 513. The bias winding 513 has one side thereof connected with lead wire 120 and has an opposite side connected with the junction 514. A resistor 515 is connected between lead wire 120 and the junction 514 and a resistor 516 is connected between junction 514 and 517. A resistor 518 connects the junctions 519 and 517 and a rectifier 520 is connected between the junction 519 and the lead wire 122. A rectifier 521 is connected between junction 519 and the lead wire 124. A series connected resistor 522 and rectifier 523 are connected between junction 517 and the lead wire 120. A condenser 524 connects the junction 519 with the lead wire 120 and it is seen that the lead wire 120 is connected with the lead wire 525. The lead wire 525 is connected with junction 526 as is clearly apparent from the drawing. The control winding 512 of the magnetic amplifier circuit is connected to the lead wires 397 and 530. The lead wire 530 is connected to one side of a resistor 531, the opposite side of this resistor being connected with lead wire 532. Lead wire 532 is connected with the shiftable contactor 252 and is connected with the junction 533. A rectifier 534 connects the junction 533 and the fixed contact 254. The opposite side of the rectifier 534 is connected with the lead wire 470 as is clearly apparent from an inspection of FIGURE 2C.

The negative feedback winding 511 has one side thereof connected with lead wire 525 and has an opposite side connected with a Zener diode 536. The Zener diode 536 as is well known to those skilled in the art breaks down when a predetermined voltage is applied thereacross and then operates as a constant voltage device. The opposite side of Zener diode 536 is connected with junction 537 and this junction is connected with resistors 538 and 539. The resistor 539 is connected with lead wire 540 which, in turn, is connected to one side of the relay coil 500, to one side of resistor 541 and to one side of the positive feedback winding 510. A condenser 542 is connected between lead wire 540 and the junction 526. One side of the relay coil 500 is connected with the lead wire 544 and it is seen that this lead wire is connected with the shiftable contactor 255 that is operated by relay coil 246.

The positive feedback winding 510 is connected with lead wire 507 via a resistor 550 and is connected with a junction 551. The lead wire 243 shown in the top portion of FIGURE 2C, as has been noted hereinbefore, is connected with the point 244 of a junction block. This junction block has another junction point 552 which is connected with junction point 553 on the other junction block. The junction point 553 is connected with an electrical datum control switch whereas the junction point 552 is connected with a circuit that controls the temperature datum valve brake.

The null circuit designated by reference numeral 80 which has now been described, is fed with A.C. power from the lead wires 116, 118 and 120 which are connected with the secondary winding 102. The bias winding 513 is fed from the lead wires 122 and 124 and, thus, from the secondary 104 of transformer 84. The control winding 512 is fed from the junctions 386 and 393 of FIGURE 2C which are output terminals of the magnetic amplifier circuit 72. It can be seen that the junctions 386 and 393 also serve to drive the saturable reactor motor drive circuit 74.

When the null circuit 80 is energized bias current through the bias winding 513 is adjusted by the resistor 515 to cut off the output of the magnetic amplifier at all times. In other words, with a zero or negative control current the output is very small and is below the voltage necessary to drive the relay coil 500. The relay coil therefore remains de-energized and the shiftable contactor 501 does not become engaged with the contact 502. When a positive control current, however, is caused to flow in the control winding 512 this current flow subtracts from the biasing due to the bias winding 512 and the magnetic amplifier will have a small output which begins to flow through the relay coil 500 via the lead wire 540. Part of this current flows through the positive feedback winding 510 which further reduces the biasing of the magnetic amplifier. The net effect of the positive feedback is an avalanche effect which causes the amplifier, once started, to saturate and place full output across the relay coil 500. After the voltage reaches a preset level, however, the Zener diode 536 will fire causing current to flow through the negative feedback winding 511 and this action holds the voltage across the relay coil 500 at the level desired and keeps the amplifier from fully saturating and thus maintaining it in its operating range. If it were not for the Zener diode and negative feedback winding circuit it is possible that the relay coil 500 would not become de-energized when the control current reverses or becomes zero. With the system described when the control current does become zero or reverses, the relay coil 500 will not be energized sufficiently to maintain the contactor 501 in engagement with the contact 502. It thus is seen that the negative feedback winding and Zener diode play an important part in the functioning of the null circuit 80.

The null circuit 80 will be energized when the voltage at the output junctions 393 and 386 of magnetic amplifier 72 is of such a value as to indicate a dangerous over temperature condition of the engine. Thus, in the limiting mode of operation and during landing the pilot may actuate suitable circuits which will cause the brake 56 to engage the brake disk 54 to hold the fuel control in a predetermined position. The function of relay coil 500 is to cause an energization of the relay coil 58 where the temperature increases to such a point that it is imperative that the brake be released. The null circuit 80 will thus sense this condition by the voltage applied to it from the magnetic amplifier 72 and will cause the relay 500 to be energized when required. The null circuit provides for positive engagement and disengagement of the contactor 501 with the fixed contact 502 by reason of the magnetic amplifier arrangement which has been described hereinbefore.

Referring now more particularly to FIGURE 2D, the demodulator circuit or phase responsive circuit 78 is shown enclosed in dotted lines. The purpose of this circuit is to feed a signal back to the input of magnetic amplifier 68 that is an indication of the rate of change of the shifting of the valve 40. This is accomplished by feeding the output voltage of generator 50 back into the circuit 78 and this circuit supplies a signal to the input of magnetic amplifier 68 that is an indication of the direction of rotation of the rotor of generator 50 as well as its rate of change of speed.

The demodulator or phase responsive circuit 78 includes a pair of pnp transistors 600 and 601 each having emitter, collector, and base electrodes. It is seen that the emitter electrodes of these transistors are connected by resistors 602, 603 and the potentiometer 604 having a slider 605. The slider 605 is connected with a junction 606 and this junction is connected with junction 607 via lead wire 630. The junction 607 is connected between rectifiers 608 and 609, rectifier 609 being connected to lead wire 146 and the rectifier 608 being connected with lead wire 268. The base electrodes of transistors 600 and 601 are connected with resistors 610 and 611. The resistors 612 and 613 are connected respectively across the emitter and base electrodes of the transistors 600 and 601. It is seen that the resistors 610 and 611 are connected with a common lead wire 615 whereas the junction 606 is connected with lead wire 616. A rectifier 617 is connected directly across the lead wires 615 and 616. The lead wires 615 and 616 extend over into FIGURE 2C and it is seen that these lead wires in FIGURE 2C are connected with junction points 620 and 621 on a junction block. The junctions 620 and 621 are connected with the output of the tachometer generator 50, this output winding being designated by reference numeral 52 in FIGURE 1.

In the operation of the demodulator or phase responsive circuit 78, and as has been noted hereinbefore, the output of the tachometer generator 50 of FIGURE 1 is applied to the lead wires 615 and 616 and this voltage during a half cycle of the A.C. voltage will cause the transistors 600 and 601 both to become conductive from collector to emitter at the same time. On the other half cycle of applied voltage both of the transistors 600 and 601 will be rendered non-conductive between collector and emitter because of the voltages applied between base and emitter. During the time that the transistors 601 and 600 are conductive from emitter to collector current will flow through one of the rectifiers 608 or 609 and will also flow through the load resistor 265 illustrated in FIGURE 2A. This circuit will be energized from the secondary winding 144 of transformer 84 via the lead wires 145 and 146.

Assuming that on a first half cycle of applied voltage from the tachometer generator that both transistors 600 and 601 are rendered conductive and further assuming that at this time the lead wire 146 is positive with respect to lead wire 145, a circuit may be traced from secondary winding 144, through lead wire 146, through the collector and emitter path of transistor 601, through resistor 602, through the shiftable tap 605 to the junction 606, through the lead wire 630, through rectifier 608, through lead wire 268, through the load resistor 265, and thence through lead wire 145 back to the opposite side of the transformer winding 144. It will be observed that the current flow through resistor 265 is in one direction and is direct current, due to the provision of the rectifier 608.

It will be appreciated that on the other half cycle of applied voltage from the tachometer generator there will be no voltage developed across resistor 265 since both transistors 600 and 601 will be non-conductive.

If the phase angle of the output voltage of the tachometer generator is shifted due to a reverse in direction in rotation of the rotor of the tachometer generator a voltage will be developed across resistor 265 that is of an opposite polarity. With such an arrangement, current will now flow from transformer secondary winding 144, through lead wire 145, through resistor 265, through lead wire 268, through the collector to emitter circuit of transistor 600, through resistor 603, through a portion of the resistor 604 to the tap 605, through junction 606, through lead wire 630, through the rectifier 609, and back through lead wire 146 to an opposite side of the secondary winding 144. With this mode of energization it is seen that the current flow through the load resistor 265 has been reversed due to a reversal in direction of rotation of the rotor of tachometer generator 50. This tachometer generator is sometimes referred to as an eddy current type having an input winding and an output winding and wherein the output voltage is 90° out of phase with the input voltage.

It can be seen from the foregoing that the circuit 78 develops a voltage across resistor 265 which is dependent upon the phase relationship of the output voltage of the tachometer generator and the output voltage of secondary winding 144. This voltage, as can be seen from FIGURE 2A, is fed to the input of the magnetic amplifier 68 as well as the signal voltage that is developed as a result of the thermocouple input being compared with the preset setting of the resistance network 62. It will also be appreciated that the signal that is fed back to the magnetic amplifier 68 is indicative of the direction of rotation of the tachometer generator and also will be an indication of its acceleration since its output voltage is proportional to its speed and will control the conductivity of transistors 600 and 601.

The relay 210 illustrated in FIGURE 2A, as has been noted hereinbefore, is a speed sensitive slave relay which has its energization controlled through a relay box in accordance with the speed of the turbo prop engine. Thus, under certain speeds of the turbo prop engine the relay will remain de-energized so that the contactor 209 is in engagement with the fixed contact 211 and thus completes a circuit to the potentiometer 214 which is the normal limit potentiometer. Under other conditions of operation, the relay coil 210 will be energized to shift the contactor 209 into engagement with fixed contact 208 and bring the potentiometer 205 into play which is the start limit potentiometer. As an example of rotational speed, the speed sensitive slave relay 210 may be energized when the engine is below 94% of its rated speed and will be de-energized at speeds above this speed.

The limit select relays 239 and 246 are controlled from the relay box and are connected with the coordinator 223. These relays serve to make switching connections in accordance with shifting of the pilot control lever. As an example, the shifting may occur when the pilot control lever is open from less than 63° to a point greater than 63°.

In summarizing the operation of the system which now has been described it is apparent that the voltage developed by the thermocouple 60 in the air inlet of the engine 10 is compared with a voltage developed in the resistor network 62 and that the algebraic addition of these voltages is applied to the input of the magnetic amplifier 68. The output of magnetic amplifier 68 is then fed through magnetic amplifiers 70 and 72 to saturable reactor motor drive circuit 74 where it causes the two phase motor 48 to drive the valve 40 and the tachometer generator 50. The tachometer generator feeds the phase sensitive circuit 78 and the output of this circuit is fed back to the input of the magnetic amplifier 68 to provide a rate feedback. As has been noted hereinbefore, the temperature datum brake will be released by the null circuit 80 whenever the output of the magnetic amplifier 72 is such as to cause the magnetic amplifier 80 to sufficiently energize the relay coil 500. It will be appreciated from the foregoing that the fuel control amplifier varies the by-passing of the fuel to the engine 10 in accordance with the turbine inlet temperature which is sensed by the thermocouple 60.

It is important to note that this fuel control amplifier employs no thermionic tubes and therefore is rugged in operation and accurate in response. It is also noted that this amplifying system consists entirely of magnetic amplifiers which are designed to have an accurate response but which yet are rugged enough in operation to meet the requirements of this type of system.

While the embodiments of the present invention as herein disclosed, constitute preferred forms, it is to be understood that other forms might be adopted.

What is claimed is as follows:

1. A fuel amplifier for controlling the fuel supplied to a gas turbine engine in accordance with turbine air inlet temperature comprising, means for developing a first voltage that is an indication of turbine air inlet temperature, a source of reference voltage, a source of A.C. voltage, means for combining said source of reference voltage and said first voltage to provide a control signal voltage, fuel control means for varying the fuel supplied to said engine including an A.C. electric motor, a generator having an A.C. output driven by said motor, magnetic amplifier means having an input connected with said control signal voltage and having an output for energizing said A.C. electric motor, and a phase responsive rate feedback circuit having a first A.C. input connected with the output of said A.C. generator and having a D.C. output connected with the input of said magnetic amplifier means, said rate feedback circuit including first and second three terminal semiconductors each having a pair of current carrying terminals and a control terminal, first and second diodes, a voltage developing circuit element prividing said D.C. output for said rate feedback circuit, a first current path connected across said source of A.C. voltage including in a series circuit the current carrying terminals of said first three terminal semiconductor, said voltage developing circuit element and said first diode, a second current path connected across said source of A.C. voltage including in a series connection, the current carrying terminals of said second three terminal semiconductor, said voltage developing circuit element and said second diode, and means providing a second input for said rate feedback circuit connected with the control terminals of said first and second semiconductors, said last named means being connected with the output of said A.C. generator, said voltage developing circuit element developing said D.C. signal voltage which is applied to the input of said magnetic amplifier means to provide a D.C. rate feedback signal in accordance with the comparative phase relationship of the voltage of said source of A.C. voltage and the A.C. output voltage of said generator.

2. The fuel control amplifier according to claim 1 wherein the first and second semiconductors are transistors having emitter, collector and base electrodes and wherein the base electrodes are the control electrodes.

3. A fuel control amplifier for controlling the fuel supplied to a gas turbine engine in accordance with turbine air inlet temperature comprising, thermocouple means positioned to respond to turbine air inlet temperature and providing an output voltage that is proportional to said air inlet temperature, voltage reference means including a Zener diode providing a source of constant potential direct current voltage, means providing a control voltage that is proportional to the difference in voltage developed by said voltage reference means and said thermocouple means, fuel control means connected with said engine including a shiftable element for varying the amount of fuel supplied to said engine, an A.C. electric motor connected with the shiftable element of said fuel control means for shifting the same, a saturable reactor motor drive circuit connected with said A.C. motor for energizing the same, a plurality of magnetic amplifiers connected in series, one of said magnetic amplifiers being connected with said control voltage and one of them being connected with said saturable reactor motor drive circuit, a tachometer generator having an A.C. output driven by said motor, a source of A.C. voltage, a phase responsive circuit connected with said A.C. tachometer generator and with said source of A.C. voltage, said phase responsive circuit including a pair of transistors and a pair of diodes, a voltage developing circuit element forming a part of said phase responsive circuit and developing a D.C. voltage which is applied to the input of said magnetic amplifiers, a first circuit connected across said source of A.C. voltage including in a series connection the emitter-collector circuit of one of said transistors, one of said diodes and said voltage developing circuit element, a second circuit connected across said source of A.C. voltage including in a series connection the emitter-collector circuit of said other transistor, said other diode and said voltage developing circuit element, the output voltage of said A.C. tachometer generator being connected with the base electrodes of said transistors, an electrically controlled brake for holding the shiftable element of said fuel control means in a predetermined position, and means including a magnetic amplifier causing said brake to be released when the output of said series connected magnetic amplifiers is of a predetermined value, the magnetic amplifier controlling said electrically operated brake including positive and negative feedback windings and a Zener diode connected with the negative feedback winding.

4. A fuel control amplifier for varying the fuel supplied to a gas turbine engine in accordance with turbine air inlet temperature comprising, a thermocouple means positioned to respond to turbine air inlet temperature and producing an output voltage that is proportional to said turbine air inlet temperature, voltage reference means, means providing a control voltage that is proportional to the difference in the voltage developed by said voltage reference means and said thermocouple means, fuel control means connected with said engine including a shiftable element for varying the amount of fuel supplied to said engine, an electric motor for driving the shiftable element of said fuel control means, means for energizing said electric motor including first magnetic amplifier means having an input connected with said control voltage and having an output directly connected with said motor, an electrically controlled brake for holding the shiftable element of said fuel control means in a predetermined position, and means for releasing said brake including second magnetic amplifier means having an input connected with the output of said first magnetic amplifier means and having an output connected with said electrically controlled brake, said second magnetic amplifier means having positive and negative feed-back windings and including a Zener diode connected with said negative feed-back winding.

References Cited in the file of this patent

UNITED STATES PATENTS

| | | |
|---|---|---|
| 2,760,337 | Ciscel et al. | Aug. 28, 1956 |
| 2,841,336 | Martin | July 1, 1958 |
| 2,870,417 | Rowley | Jan. 20, 1959 |
| 2,871,442 | Perkins | Jan. 27, 1959 |
| 2,904,727 | Chen | Sept. 15, 1959 |
| 2,921,241 | McFarland | Jan. 16, 1960 |
| 2,938,340 | Boyer et al. | May 31, 1960 |
| 3,032,703 | Lowrance | May 1, 1962 |
| 3,049,881 | Braunagel | Aug. 21, 1962 |
| 3,064,422 | Nehr | Nov. 20, 1962 |

FOREIGN PATENTS

| | | |
|---|---|---|
| 1,149,483 | France | July 15, 1957 |

OTHER REFERENCES

"Electrical Engineering Theory and Practice" (Second Edition) by Erickson et al., John Wiley and Sons, Inc., New York, 1959, pages 403–6.